US008522942B2

(12) United States Patent
Bell et al.

(10) Patent No.: US 8,522,942 B2
(45) Date of Patent: Sep. 3, 2013

(54) SYSTEMS AND METHODS FOR SELECTIVELY DISENGAGING A CLUTCH TO PROTECT ENGINES FROM DAMAGE

(76) Inventors: Matthew E. Bell, Los Altos, CA (US); David B. Bell, Los Altos, CA (US)

(*) Notice: Subject to any disclaimer, the term of this patent is extended or adjusted under 35 U.S.C. 154(b) by 376 days.

(21) Appl. No.: 12/849,752

(22) Filed: Aug. 3, 2010

(65) Prior Publication Data
US 2012/0031086 A1 Feb. 9, 2012

(51) Int. Cl.
*F16D 25/08* (2006.01)
*F16D 25/12* (2006.01)

(52) U.S. Cl.
USPC .... 192/83; 192/85.57; 192/85.59; 192/85.63; 192/104 F

(58) Field of Classification Search
USPC .................. 192/104 F; 60/566, 567, 551
See application file for complete search history.

(56) References Cited

U.S. PATENT DOCUMENTS

| | | | |
|---|---|---|---|
| 3,684,071 A | 8/1972 | Wheymann | |
| 3,926,288 A | 12/1975 | Nerstad | |
| 4,142,488 A * | 3/1979 | Steinecke et al. | 192/104 F |
| 4,166,442 A | 9/1979 | Henderson et al. | |
| 5,507,373 A | 4/1996 | Nguyen | |
| 5,902,211 A | 5/1999 | Jones et al. | |
| 5,934,432 A | 8/1999 | Bates | |
| 6,298,969 B1 | 10/2001 | Nagler et al. | |
| 6,536,573 B2 | 3/2003 | Nagler et al. | |
| 6,607,060 B2 * | 8/2003 | Inoue | 192/83 |
| 6,871,734 B2 | 3/2005 | Kupper et al. | |
| 6,996,985 B2 | 2/2006 | Bornkessel et al. | |
| 7,465,252 B2 | 12/2008 | Welter et al. | |
| 2002/0065598 A1 | 5/2002 | Denz et al. | |
| 2007/0007097 A1 | 1/2007 | Fraser et al. | |
| 2007/0175727 A1 | 8/2007 | de Salis et al. | |
| 2007/0205072 A1 * | 9/2007 | Villata et al. | 192/91 R |
| 2008/0078641 A1 | 4/2008 | Iwashita et al. | |
| 2009/0222182 A1 | 9/2009 | Tomoda et al. | |

FOREIGN PATENT DOCUMENTS

EP 0 090 945 A2 * 10/1983

* cited by examiner

*Primary Examiner* — Rodney Bonck
(74) *Attorney, Agent, or Firm* — Vierra Magen Marcus LLP

(57) ABSTRACT

Embodiments of the present invention are generally related to methods and devices for use with vehicles that include a clutch, a transmission, a slave cylinder, a master cylinder and an engine. In accordance with an embodiment, a device includes a primary piston configured to urge hydraulic fluid into a slave cylinder, when the primary piston is moved from a first position to a second position, to thereby disengage the clutch from the transmission. The primary piston is normally movable from the first position to the second position by hydraulic actuation of a master cylinder. A secondary piston is configured to selectively apply force to the primary piston, to move the primary piston from the first position to the second position, when the secondary piston is selectively actuated. The secondary piston can be selectively actuated by a secondary fluid, such as a compressed gas. Methods and devices are used to selectively disengage the clutch from the transmission when an operating condition that can be damaging to the engine is detected.

27 Claims, 6 Drawing Sheets

SYSTEMS AND METHODS FOR SELECTIVELY DISENGAGING A CLUTCH TO PROTECT ENGINES FROM DAMAGE

TECHNICAL FIELD

The present invention relates generally to systems and methods for selectively disengaging a clutch coupling a power plant to a transmission.

BACKGROUND OF THE INVENTION

Internal combustion engine-powered vehicles require transmissions because of the physics of the internal combustion engine. A rotation speed of an output shaft and/or flywheel of an engine has a maximum revolutions per minute ("RPM") value, known as redline, above which the engine cannot operate without risking damage to the engine. The transmission allows the gear ratio between the engine and drive wheels to change as the vehicle speeds up and slows down so that the engine stays below redline and near the RPM band of its best performance. In a manual transmission, various gear ratios are achieved by engaging different sets of gears coupled to the drive shaft by a driver operating a shifter. A clutch mechanically couples and decouples an output shaft of the engine to an input shaft of the manual transmission. Disengaging the clutch decouples the shafts and allows the driver to engage and disengage different sets of gears by operating the shifter.

FIG. 1 illustrates an exemplary manual transmission and clutch mechanism in accordance with the prior art. As used herein, a clutch mechanism collectively refers to a slave cylinder, master cylinder, and clutch. There are different clutch mechanism designs, but many are based on one or more friction discs, pressed tightly against a flywheel using one or more springs, for example a diaphragm spring. The one or more friction discs and flywheel, shown in phantom as block 6, are held within a bell housing 16. The flywheel is operably connected with an output shaft of the engine 2 and the one or more friction discs are operably connected with an input shaft of the transmission 4. Friction clutches are mainly actuated through four techniques: mechanically, whereby the clutch is actuated by a lever or pedal connected to the friction clutch through compound linkages and operated by hand or foot; pneumatically, whereby air pressure is used to actuate valves and pistons to engage the clutch while disengagement is achieved through spring force; hydraulically, whereby hydraulic fluid is used to exert pressure on hydraulic valves and pistons to actuate the clutch; and electrically, whereby compound linkages and mechanical actuation are replaced with electromagnets and/or solenoids.

The clutch mechanism shown in FIG. 1 is a hydraulically actuated friction clutch. A slave cylinder 10 is connected to the bell housing 16, and when actuated operates a bearing via a throw-out lever 18 to release a diaphragm spring and disengage the clutch (i.e., allow the one or more friction discs to separate from the flywheel). The slave cylinder 10 is actuated by hydraulic fluid urged into the slave cylinder 10 to push a piston connected with a shaft outward of the slave cylinder housing. The hydraulic fluid is urged into the slave cylinder 10 by a master cylinder 8 connected with the slave cylinder 10 through a first hydraulic line, which as shown includes a flexible hydraulic hose 22 connected with a rigid hydraulic line 26. The master cylinder 8 is connected to a hydraulic fluid reservoir 12 for replenishing hydraulic fluid by a second hydraulic line 20. A clutch pedal 14 is disposed in a cabin of the vehicle so as to be operable by a driver. The clutch pedal 14 of FIG. 1 is merely exemplary. Myriad different configurations and mechanical means exist for actuating a clutch pedal. As shown, when the clutch pedal 14 is depressed, a piston within the master cylinder is urged inward by a shaft 28 actuated with the clutch pedal 14, forcing hydraulic fluid into the flexible hydraulic hose 22 to actuate the slave cylinder 10. When the clutch pedal 14 is released, a spring 24 urges the clutch pedal 14 away from the master cylinder 8 and the hydraulic fluid is drawn and/or urged back into the master cylinder 8, drawing and/or urging the piston and shaft of the slave cylinder 10 back into the slave cylinder housing and actuating the throw-out lever 18 so that the diaphragm spring applies force to engage the clutch.

As mentioned above, an engine is at risk of damage when operating above redline. An engine can also be at risk of damage if the RPMs of the engine increase dramatically in a short period of time. One or both situations may occur under a number of different operational circumstances, many of which result from driver error. For example, where a driver operating an engine at an engine speed approaching redline disengages the clutch to shift gear ratios, but mistakenly selects a lower gear ratio (e.g., shifts from third gear to second gear). When the driver engages the clutch, the engine speed will accelerate rapidly and beyond redline, likely causing engine damage.

SUMMARY

Embodiments of the present invention are generally related to methods and devices for use with vehicles that include a clutch, a transmission, a slave cylinder, a master cylinder and an engine, where the methods and devices are used to selectively disengage the clutch from the transmission. In accordance with an embodiment, a device includes a primary piston configured to urge hydraulic fluid into a slave cylinder, when the primary piston is moved from a first position to a second position, to thereby disengage the clutch from the transmission. The primary piston is normally movable from the first position to the second position by hydraulic actuation of a master cylinder. A secondary piston is configured to selectively apply force to the primary piston, to move the primary piston from the first position to the second position, when the secondary piston is selectively actuated independent of hydraulic actuation of the master cylinder. In a vehicle with a clutch pedal for actuating the master cylinder, the clutch pedal can be drawn to a depressed position by capillary force when the secondary piston is actuated. If the clutch pedal is already in a depressed position, the clutch pedal will not be hydraulically forced to an at-rest position.

Embodiments of the present invention are also related to methods and devices for use with vehicles that include a clutch, a sequential manual transmission ("SMT"), a slave cylinder, and an engine, where the methods and devices are used to selectively disengage the clutch from the SMT. In accordance with an embodiment, a device includes a primary piston configured to urge hydraulic fluid into a slave cylinder, when the primary piston is moved from a first position to a second position, to thereby disengage the clutch from the SMT. In an SMT, such as a direct shift gearbox ("DSG"), the slave cylinder is normally actuated in response to a computer command from the vehicle. A secondary piston is configured to selectively apply force to the primary piston, to move the primary piston from the first position to the second position, when the secondary piston is selectively actuated independent of the vehicle.

In an embodiment, the device is selectively actuated by a secondary fluid. The secondary fluid can be a compressed gas, for example, nitrogen, carbon dioxide, nitrous oxide, oxygen, air, or combinations thereof, or a pressurized liquid, but is not limited thereto. The device can include a primary chamber within which is located the primary piston and a secondary chamber within which is located the secondary piston. A solenoid valve can further be configured to selectively introduce the secondary fluid into the secondary chamber to thereby actuate the secondary piston.

In an embodiment, the device is selectively actuated by a solenoid rather than a secondary fluid. The device can include a primary chamber within which is located the primary piston and a secondary chamber within which is located the secondary piston. The solenoid can be configured to selectively apply an electromagnetic field which actuates the secondary piston.

In accordance with an embodiment, a method includes monitoring for a triggering condition that relates to a rotation rate of an engine. When the triggering condition is not detected, the master cylinder is allowed to control urging hydraulic fluid into the slave cylinder. However, when the triggering condition is detected, hydraulic fluid is urged into the slave cylinder to rapidly disengage the clutch from the transmission, independent of an action of the master cylinder of the vehicle.

In an embodiment, the triggering condition being monitored for is detected when at least one of the following events is detected: (1) a metric indicative of a rotation rate of the engine exceeds a first threshold, (2) the metric indicative of the rotation rate of the engine exceeds the first threshold for at least a specified period of time, (3) a metric indicative of a rate of change of the rotation rate of the engine exceeds a second threshold, and (4) the metric indicative of the rate of change of the rotation rate of the engine exceeds the second threshold for at least a specified period of time. Alternatively, the triggering condition being monitored for is detected when at least two (or at least three) of the events of (1), (2), (3) and (4) are detected.

In an embodiment, hydraulic fluid is urged into the slave cylinder by moving a primary piston arranged between the master cylinder and the slave cylinder, and the primary piston is moved by engaging the primary piston using a secondary piston actuated by a secondary fluid, the secondary fluid being introduced to the secondary piston in response to detecting the triggering condition.

In an embodiment, the primary piston is moved in a first direction so that hydraulic fluid is urged into the slave cylinder, and the secondary piston resists return movement of the primary piston, thereby removing control of engagement and disengagement of the clutch by the master cylinder.

In an embodiment, the secondary fluid that was introduced is thereafter exhausted so that the secondary piston moves from an actuated position to an unactuated position, to thereby return control of engagement and disengagement of the clutch to the master cylinder. For example, exhausting can be performed in response to at least one of the following events: (1) receiving an indication from a driver to return control of engagement and disengagement of the clutch to the master cylinder, and (2) receiving an indication that the triggering condition is no longer detected.

In an embodiment, the device to selectively disengage the clutch from the transmission includes a primary cylinder, a secondary cylinder, and an aperture extending between the secondary cylinder and the primary cylinder. The primary cylinder includes a first opening hydraulically connectable with the master cylinder, a second opening hydraulically connectable with the slave cylinder, and a primary piston arranged between the first opening and the second opening and biased toward the first opening. The secondary cylinder includes an inlet adapted to selectively receive a secondary fluid, a secondary piston biased toward the inlet, and a shaft connected with the secondary piston. The shaft connected with the secondary piston is received at least partially within the aperture and a seal is formed between the shaft and the aperture such that the primary cylinder is substantially isolated from the secondary cylinder. The clutch is disengageable from the transmission when fluid is urged from the primary cylinder to the slave cylinder by moving the primary piston toward the second opening. The primary piston is movable toward the second opening by urging fluid from the master cylinder into the primary cylinder at the first opening of the primary cylinder. The primary piston is also movable toward the second opening by introducing the secondary fluid into the secondary cylinder at the inlet to move the secondary piston toward the aperture so that the shaft moves through the aperture and contacts the primary piston.

In an embodiment, the device includes a valve adapted to substantially seal the inlet of the secondary cylinder from the secondary fluid, wherein the valve is adapted to selectively allow the secondary fluid to enter the inlet of the secondary cylinder in response to a signal from a controller. The valve may include an electronically controlled solenoid valve. The controller can be adapted to monitor for a triggering condition that relates to a rotation rate of the engine, and in response to detecting the triggering condition generate the signal to cause the valve to allow the secondary fluid to enter the inlet of the secondary cylinder. For example, the controller is adapted to detect the triggering condition when the controller detects at least one of the following events: (1) a metric indicative of a rotation rate of the engine exceeds a first threshold, (2) the metric indicative of the rotation rate of the engine exceeds the first threshold for at least a specified period of time, (3) a metric indicative of a rate of change of the rotation rate of the engine exceeds a second threshold, and (4) the metric indicative of the rate of change of the rotation rate of the engine exceeds the second threshold for at least a specified period of time. Alternatively, the controller is adapted to detect the triggering condition when the controller detects at least two (or at least three) of the events of (1), (2), (3) and (4).

In an embodiment, a travel distance of the primary piston is adjustably limited. For example, the device can includes a stop connectable with the primary cylinder and adjustable to limit the travel distance of the primary piston. The stop may be, for example, a cap having internal threads mateable and advanceable along external threads of the primary cylinder, or a screw having external threads mateable and advanceable along internal threads of the primary cylinder.

In an embodiment, the primary piston is biased toward the inlet by a first spring and the secondary piston is biased toward the inlet by a second spring.

In an embodiment, the primary cylinder also includes a third opening between a fully biased position of the primary piston and the second opening. This third opening is hydraulically connectable with a fluid reservoir.

In an embodiment, the secondary cylinder also includes a vent within a wall of the secondary cylinder between the secondary piston and the aperture. The vent allows venting of the secondary cylinder to an environment when the secondary piston is moved toward the aperture.

In an embodiment, the secondary cylinder also includes a release valve to allow the secondary fluid to be vented from the secondary cylinder. The secondary cylinder can further include a bleed hole that allows the secondary fluid to predictably leak to an environment.

This summary is not intended to be a complete description of, or limit the scope of, the invention. Other features, aspects, and objects of the invention can be obtained from a review of the specification, the figures, and the claims.

DETAILED DESCRIPTION

Figure 1:
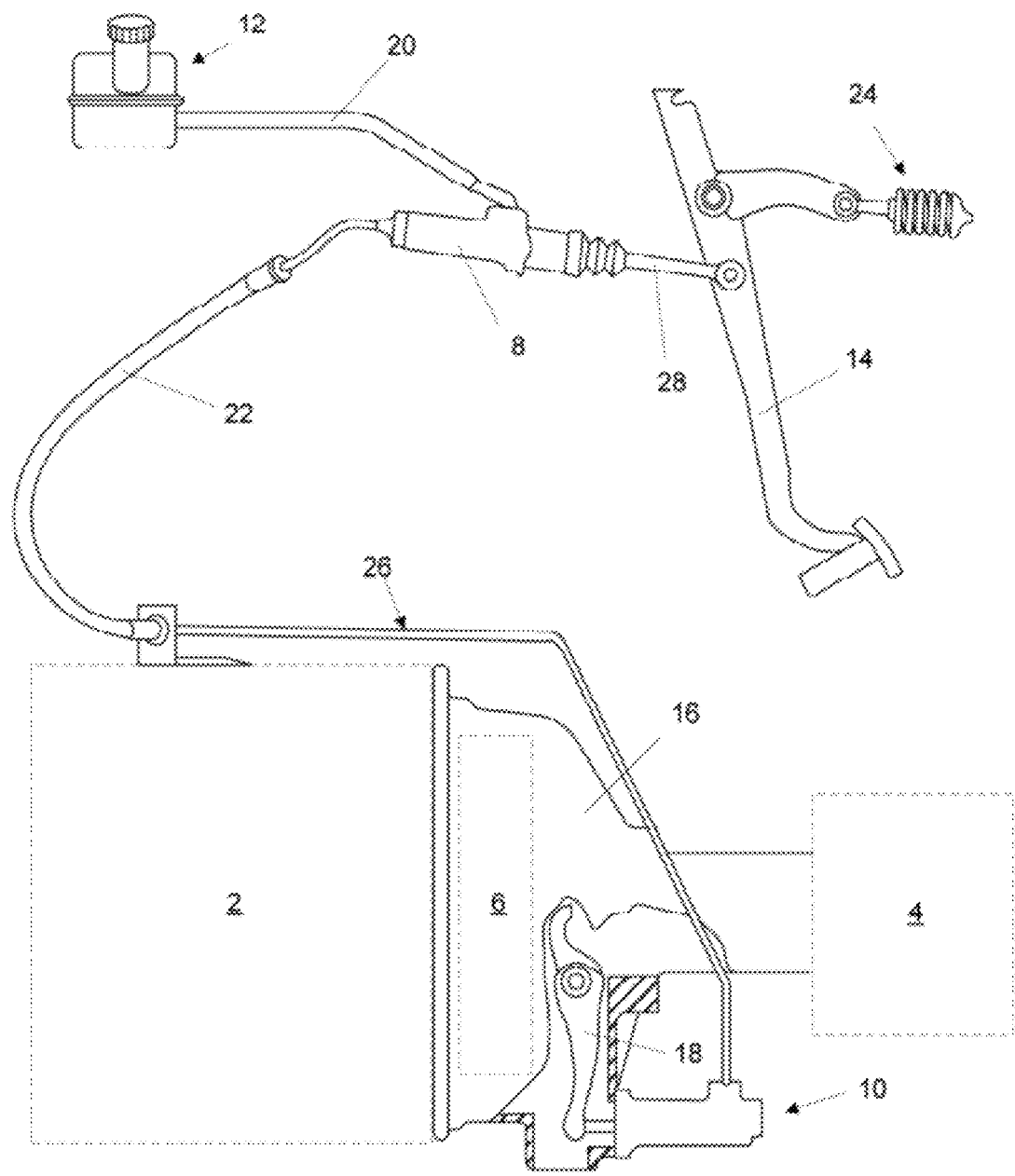
FIG. 1 is a simplified illustration of an exemplary power train and clutch mechanism in accordance with the prior art.

The following description is of the best mode presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout. Reference numerals used in a figure may or may not be referenced in the detailed description specific to such FIG. 1f the associated element is described elsewhere.

Internal combustion engines can suffer catastrophic or debilitating damage from operating above redline (i.e., redlining). For example, engine valves may 'float' when valve springs cannot close their respective valves quickly enough to outpace valve actuation by a cam lobe. Under such a condition, valves may hit the pistons, causing the valves to bend or break. Engine damage resulting from engine speeds exceeding redline can also include stressing and/or destroying connecting rods connecting respective pistons to a crankshaft. Exceeding redline for a prolonged period can also result in damage from oil starvation, whereby oil is depleted from the oil pan. Because of the costs and inconveniences involved in engine replacement or repair, it is desirable to avoid exceeding redline, even briefly.

Many modern vehicles have computer systems that prevent an engine from exceeding redline by cutting fuel flow to the fuel injectors or by disabling the ignition system until the engine speed drops to a safer operating speed. Such devices are known as rev limiters and are typically set to an RPM value at redline or a few hundred RPM above. However, even with rev limiters an engine is not prevented from exceeding redline through inadvertent gear engagement. If a driver accidentally selects a lower gear rather than a higher gear when attempting to upshift, selects a gear lower than intended while downshifting, or attempts to downshift above a certain RPM (i.e., downshifting too early), the engine will be forced to rapidly rev-up to match the speed of the drivetrain. If this happens while the engine is already at high RPMs, for example, engine speeds may dramatically exceed redline. The potential risk of engine damage can be higher in performance vehicles, such as those used in auto and drag racing, which operate at engine speeds at or near redline to maximize performance and which experience sudden and rapid engine acceleration. Rev limiters in performance vehicles typically cannot react fast enough to prevent damage during episodes of sudden and rapid engine acceleration. Further, many older vehicles and some modern vehicles are not equipped with rev limiters.

Figure 2:
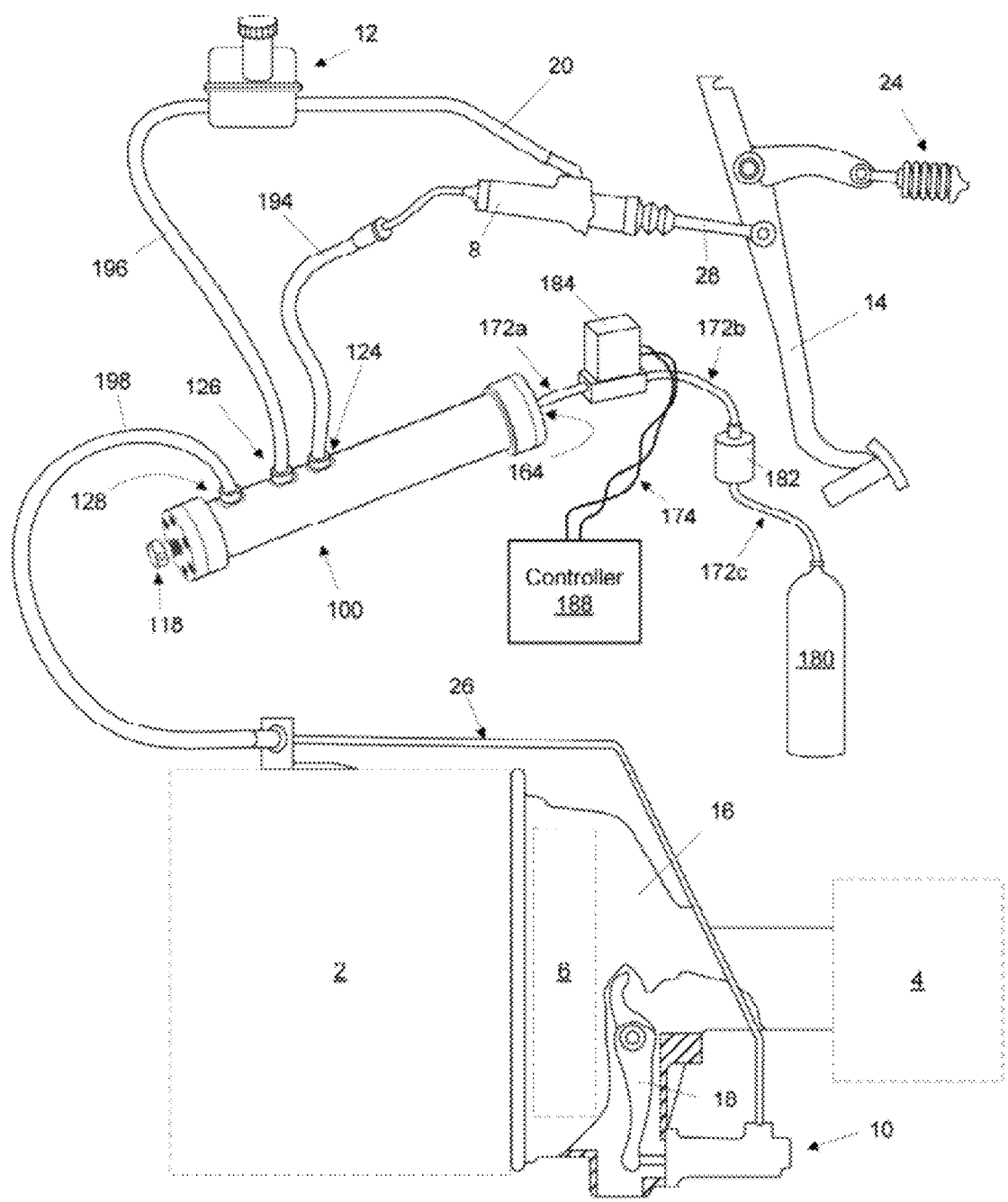
FIG. 2 illustrates an embodiment of a device for disengaging a clutch from a transmission in accordance with the present invention connected with the clutch mechanism of FIG. 1.

FIG. 2 illustrates an embodiment of a device 100 for disengaging a clutch from a transmission in accordance with the present invention. The device 100 can be fitted to an existing clutch mechanism, for example, as a kit for retro-fitting a vehicle that is already in service. Alternatively, it should be appreciated that the device can be factory installed in vehicles to supplant or supplement existing protection systems such as rev limiters. As shown, the device 100 is structurally independent of primary components of an existing clutch mechanism, i.e. the master cylinder 8, slave cylinder 10, and rigid hydraulic line 26, which are typically mounted to components of the powertrain, mounted within the engine compartment, or otherwise inconveniently and/or inaccessibly positioned. However, it will be appreciated that structures of the device 100 can alternatively be integrated into components of a clutch mechanism, such as the exemplary clutch mechanism of FIG. 1. For example, the device 100 can be integrally cast or otherwise fabricated with the slave cylinder 10 so that the device 100 and slave cylinder 10 share a casing. In such a case, a primary chamber (110 in FIG. 3) may become the slave cylinder. Alternatively, the device 100 can be integrated with the master cylinder 8. An integrated structure can be easily supplanted for an existing structure in a factory build by the original equipment manufacturer ("OEM") or retrofit to an existing vehicle by replacing the existing component.

Merely for the purpose of explaining the invention, the device 100 is shown in FIG. 2 retrofitting the clutch mechanism of FIG. 1. The device 100 is positioned so as to bisect the first hydraulic line connecting the master cylinder 8 and slave cylinder 10. The existing flexible hose 22 can be replaced by two flexible hoses: a master hose 194 connecting the master cylinder 8 to an input opening 124 of the device 100 and a slave hose 198 connecting the slave cylinder 10 (via the rigid hydraulic line 26) to an output opening 128 of the device 100. Alternatively, the existing flexible hose 22 can be separated from the master cylinder 8 and reconnected to the output opening 128 of the device 100, and a master hose 194 can be added to connect the master cylinder 8 to the input opening 124 of the device 100. In still other embodiments, the existing flexible hose 22 can be cut and fittings added to the severed ends for connecting with the input and output openings of the device 100. Although referred to as "input" and "output" openings for convenience, hydraulic fluid movement is not limited to entering the device via the input opening or leaving the device via the output opening. Rather, hydraulic fluid can move into or out of either opening, depending on whether the clutch is engaged or disengaged. The input opening and output opening can thus be alternatively referred to as a first opening and a second opening, respectively.

As shown, the hydraulic fluid reservoir 12 is also modified to connect with a hydraulic fluid opening 126 of the device 100 for replenishing hydraulic fluid via a reservoir hose 196. The hydraulic fluid reservoir 12 can be modified in any way that achieves fluid connection with both the master cylinder 8 and the device 100, for example by retrofitting the body of the hydraulic fluid reservoir 12 to include an additional outlet, by adding a t-fitting to the existing outlet, by adding a feed-through at the cap, etc. Alternatively, a pre-modified or specially designed hydraulic fluid reservoir can replace an existing hydraulic fluid reservoir. In still other embodiments, the device 100 can have a second, dedicated hydraulic fluid reservoir independent of the existing hydraulic fluid reservoir 12 connected with the master cylinder 8.

Under normal operation, upon actuation of the clutch pedal 14 the master cylinder 8 urges hydraulic fluid into the input opening 124 of the device 100. In response, the device 100 urges hydraulic fluid into the slave cylinder 10 from the output opening 128 of the device 100 and the clutch is disengaged. When the clutch pedal 14 is released, hydraulic fluid is urged and/or drawn back into the master cylinder 8 from the input opening 124 of the device 100, and in response, hydraulic fluid is urged and/or drawn out of the slave cylinder 10 and into the output opening 128 of the device 100, and the clutch is engaged. A driver is therefore able to engage and disengage the clutch by operating the clutch pedal 14. However, the device 100 also urges hydraulic fluid into the slave cylinder 10 independent of the clutch pedal 14 in response to a command from a controller 188 connected with a solenoid valve 184 wirelessly or by one or more wires 174. The solenoid valve 184 isolates an auxiliary fluid from the device 100. The terms "auxiliary" and "secondary" are used interchangeably herein, and are intended to describe structures that operate independent of the master cylinder, and are not intended to assign separate and/or different meanings or scopes. As shown, the auxiliary fluid is a source 182 of compressed gas. When the solenoid valve 184 is commanded to open, the compressed gas is forced into the device 100 through an auxiliary fluid opening 164 (also referred to herein as an inlet). The clutch is disengaged when the compressed gas enters the device 100 and hydraulic fluid is urged out of the device 100 and into the slave cylinder 10 from the output opening 128 of the device 100. The clutch pedal 14 may be drawn to a depressed position by capillary force when the compressed gas enters the device 100. If the clutch pedal 14 is already in a depressed position when the compressed gas enters the device 100, the clutch pedal will not be hydraulically forced to an at-rest position. Such an action could cause possible injury to a driver by driving the clutch pedal against the driver's foot and leg. The compressed gas can be any gas compressible so as to be safely stored and safely introduced to the device 100 at a sufficiently forceful and rapid speed to activate the device as described herein. For example, the compressed gas can include nitrogen, carbon dioxide, nitrous oxide, oxygen, air, or a combination thereof.

In other embodiments, the auxiliary fluid can be a pressurized liquid. As with the compressed gas, a source of pressurized liquid can be isolated from the device 100 by the solenoid valve 184 and the pressurized liquid can be selectively introduced to the auxiliary fluid opening 164 by opening the solenoid valve 184. In still other embodiments, a solenoid can be arranged so that at least a portion of the device is nested within the solenoid. An electromagnetic field can be applied to the device by way of the solenoid, causing components of the device to move and urge hydraulic fluid out of the device and into the slave cylinder to disengage the clutch. In such embodiments, the solenoid supplants an auxiliary fluid so that an auxiliary fluid source, an auxiliary fluid opening, and a solenoid valve to introduce the auxiliary fluid to the auxiliary fluid opening are not longer needed.

A command to open the solenoid valve 184 can be generated by the controller 188 under myriad different events. At least two different events can be applied to reduce the risk of redlining and/or reduce the risk of potentially damaging engine performance: engine speed exceeding a first threshold (e.g., redline or some value above or below redline) and acceleration exceeding a second threshold. The controller 188 can be a dedicated controller, for example the controller 188 can be an application-specific integrated circuit ("ASIC") or an off-the-shelf controller capable of performing, or programmable to perform the functions (e.g., calculations, determinations, comparisons, and the like) necessary to identify the different events. Alternatively, the controller 188 can be an OEM (or aftermarket) onboard computer installed in the vehicle to manage one or more other functions of the vehicle.

The controller 188 receives engine speed data in real-time from sensors that already provide engine speed data to a tachometer or onboard computer. Based on the engine speed data, the controller 188 can determine whether engine speed exceeds the first threshold based directly on the sensor data. The controller 188 can determine whether the second threshold has been exceeded based on the acceleration calculated using the engine speed and clock time (for example, measured by an internal clock of the controller or by an onboard computer). The second threshold event can be monitored at all engine speeds, or the second threshold event can be monitored for when the engine speed is operating at or above a prescribed RPM value. In other embodiments, more than the two events described can be monitored for and used by the controller 188 to generate and send an "open" command to the solenoid valve 184. For example, a command can be generated where the engine speed has been maintained within a certain high RPM range for a period of time that exceeds a threshold.

The solenoid valve 184 is shown as being connected with a compressed gas source 182, which is connected with a larger compressed gas reservoir 180. The compressed gas source 182 is intended to hold enough compressed gas for a single activation of the device 100, at a sufficiently high pressure to enter the device 100 with sufficient rapidity and force. Compressed gas can then be metered or fed from the compressed gas reservoir 180, which holds a larger volume of compressed gas, into the compressed gas source 182 for additional activations. As shown, the compressed gas reservoir 180, the compressed gas source 182 and the solenoid valve 184 are connected in series with the auxiliary fluid opening 164 by fluid lines 172a, 172b, 172c. However, in alternative embodiments two or more of the devices can be directly connected or even integrally formed. For example, the solenoid valve 184 can be directly connected with or mounted on the device 100, or the compressed gas source 182 can be a sub-chamber of the compressed gas reservoir 180. Alternatively, the device 100 can be a single activation device requiring the compressed gas source 182 to be manually replenished or replaced, thereby eliminating the compressed gas reservoir 180. In still further embodiments, the solenoid valve 184 and compressed gas source 182 can be eliminated by including a valve directly connected with the compressed gas reservoir 180 that is capable of metering the compressed gas introduced to the device 100. The technique and structures for selectively introducing a compressed gas to the device 100 can vary and should not be taken as limited to that shown in FIG. 2 or described herein. Any techniques and structures that are capable of selectively introducing a compressed gas to the device 100 at sufficiently high introduction speeds are within the spirit of the present invention. In alternative embodiments, any techniques and structures that are capable of selectively urging hydraulic fluid into the slave cylinder, by way of the device, at sufficiently high speeds are within the spirit of the present invention.

Figure 3:
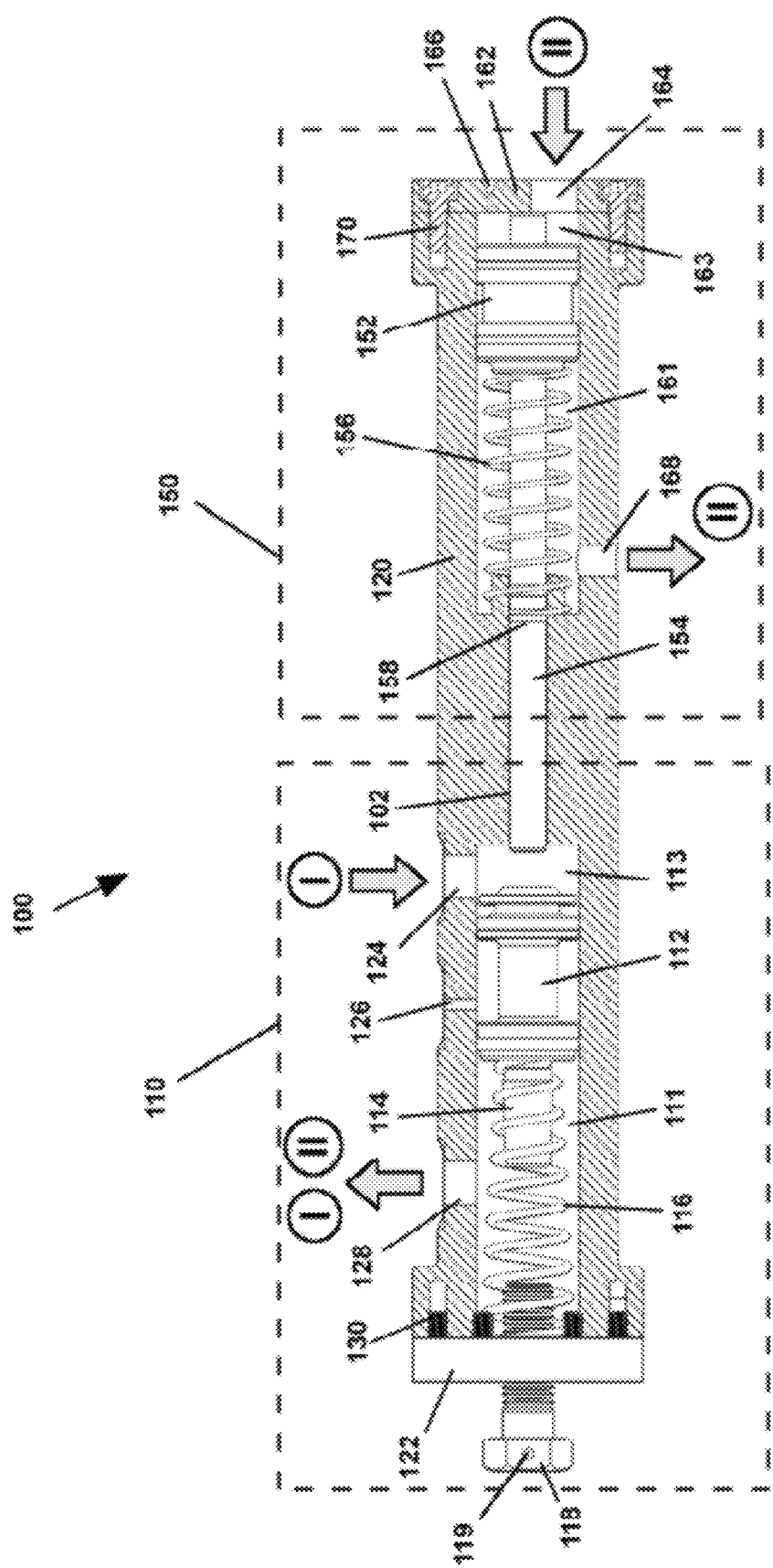
FIG. 3 is a detailed partial cross-section of an embodiment of the device for disengaging the clutch from the transmission of FIG. 2.

Referring now to FIG. 3, a detailed partial cross-section of an embodiment of a device 100 for disengaging a clutch from a transmission is shown. The device 100 includes a body 120 (shown in cross-section) sealed at a first end by a primary end cap 122 mated with the body 120 by fasteners (e.g., a plurality of screws 130, as shown) and at a second end by an auxiliary end cap 162 also mated with the body 120 by fasteners (likewise, e.g., a plurality of screws 170, as shown). The body 120 defines two chambers: a primary chamber 110 and an auxiliary chamber 150. The master cylinder of FIGS. 1 and 2 connects with the primary chamber 110 at the input opening 124. The primary chamber 110 is separated into a slave portion 111 and a master portion 113 by a primary piston 112. The primary chamber 110 and the primary piston 112, and the components thereof, collectively form a primary cylinder. The primary piston 112 is biased toward the input opening 124 by a primary spring 116. Hydraulic fluid occupies the slave portion 111.

Figure 4A:
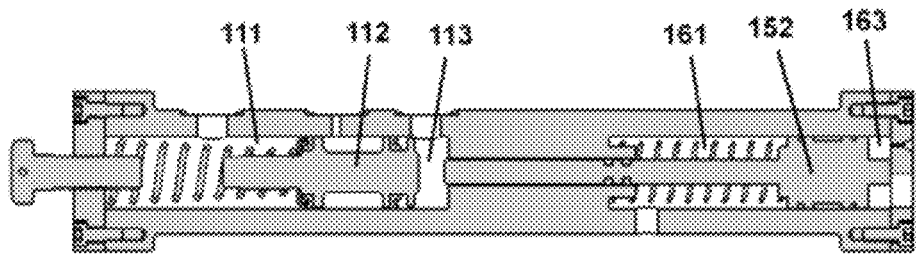
FIG. 4A is a simplified cross-section of the device of FIGS. 2 and 3 in an initial, deactivated state.
Figure 4B:
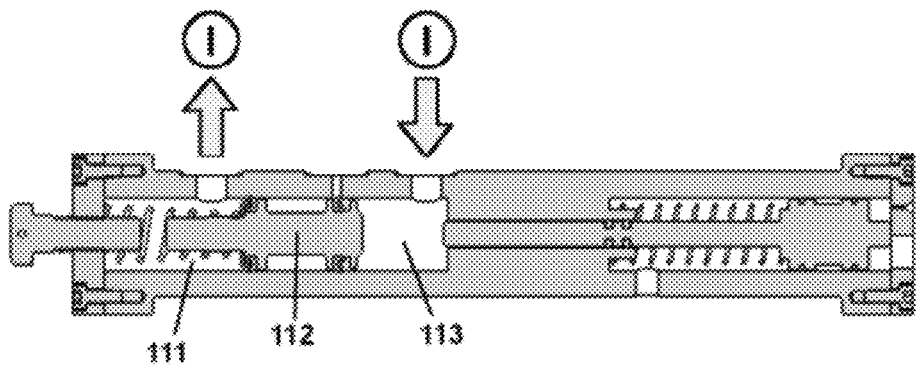
FIG. 4B is a simplified cross-section of the device of FIGS. 2 and 3 responding to actuation of a clutch by a driver.

FIG. 4A is a simplified cross-section showing the device 100 under normal operation with the clutch engaged and the clutch pedal released. When the clutch pedal is depressed, the master cylinder urges hydraulic fluid into the master portion 113 (Sequence I in FIGS. 3 and 4B). The hydraulic fluid expands the master portion 113, overcoming the force of the spring 116 and forcing the primary piston 112 to collapse the slave portion (i.e., the primary piston 112 moves from right to left in FIG. 3). The hydraulic fluid occupying the slave portion 111 is urged out of the output opening 128 of the device 100 and into the slave cylinder to disengage the clutch. FIG. 4B is a simplified cross-section showing the device 100 at least partially actuated. As can be seen, the piston 112 has moved to the left of the page and the slave portion 111 has been reduced, while the master portion 113 has been expanded.

Once the clutch pedal is released by the driver, hydraulic fluid is drawn into the master cylinder and/or urged into the master cylinder by the primary spring 116 and the clutch spring (not shown) as the bias force of the primary spring 116 and return flow from the slave cylinder overcomes the force of the hydraulic fluid. As the hydraulic fluid in the slave cylinder is drawn and/or urged into the slave portion 111 of the body 120, the clutch is engaged and the slave portion 111 and master portion 113 of the body 120 return to their original volumes shown in FIGS. 3 and 4A.

An adjustment screw 118 is threaded through the primary end cap 122 and can be adjusted to limit the throw distance of the primary piston 112 by resisting further movement of the piston when a shaft 114 connected to the primary piston 112 contacts the shaft of the adjustment screw 118. The throw distance of the primary piston 112 is adjustable so that the device 100 can accommodate vehicles having a range of slave cylinder volumes. Once the device 100 has been properly calibrated for a vehicle for which it is installed, the adjustment screw 118 can be locked in place. Myriad different techniques can be applied to lock down the adjustment screw, and embodiments of the present invention are not intended to be limited to a particular technique. For example, a wire can be threaded through a hole 119 in the head of the adjustment screw 118 and affixed to another structure to resist unintended rotation of the adjustment screw 118. Additionally, or alternatively a locking nut (not shown) can be seated against the primary end cap 122 when the adjustment screw 118 is satisfactorily positioned.

The auxiliary chamber 150 of the device 100 is connected at an auxiliary fluid opening 164 extending through the auxiliary end cap 162 to a compressed gas source. The auxiliary chamber 150 houses an auxiliary piston 152 that separates a vent portion 161 from a fill portion 163. The auxiliary chamber 150 and the auxiliary piston 152, and the components thereof, collectively form an auxiliary cylinder. The auxiliary chamber 150 is connected with the primary chamber 110 by an aperture 102. An auxiliary shaft 154 is connected with the auxiliary piston 152 and extends through at least a portion of the aperture 102. The vent portion 161 of the auxiliary chamber 150 and the master portion 113 of the primary chamber 110 are isolated from one another by gaskets 158 (e.g. o-ring seals) mated with the auxiliary shaft 154 and traveling with the auxiliary shaft 154 within the aperture 102. The gaskets 158 remain within the aperture 102 to resist comingling of fluids between the chambers 110, 150. The auxiliary piston 152 is biased toward the auxiliary fluid opening 164 by an auxiliary spring 156. The vent portion 161 is maintained at atmospheric pressure by a vent 168.

Figure 4C:
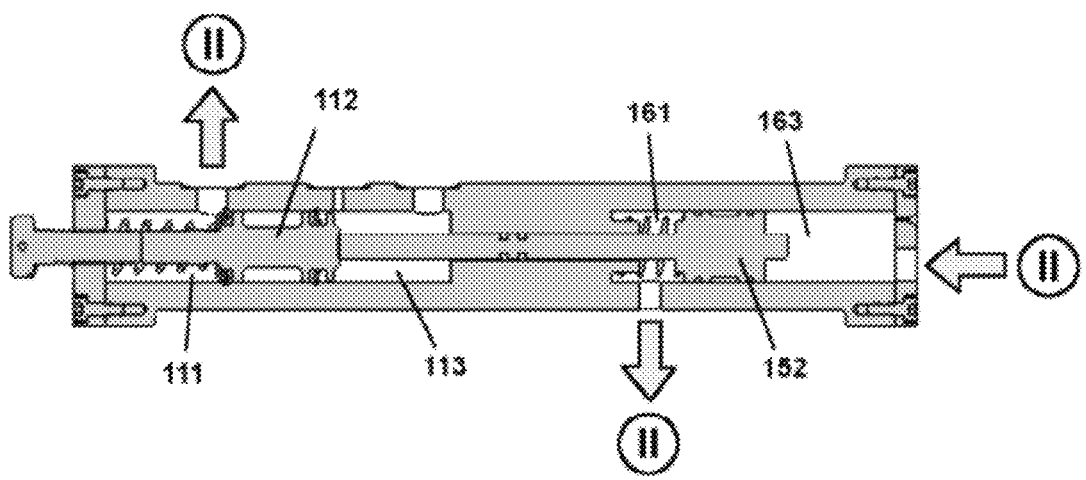
FIG. 4C is a simplified cross-section of the device of FIGS. 2 and 3 in an activated state.

Assuming the clutch is engaged and the clutch pedal is released, FIG. 4A is again referenced to show the device 100 under normal operation. When the controller determines that a threshold has been exceeded (e.g. the first or second threshold as described above), compressed gas is introduced to the fill portion 163 through the auxiliary fluid opening 164 (Sequence II in FIGS. 3 and 4C). The compressed gas expands the fill portion 163, overcoming the force of the auxiliary spring 156 and forcing the auxiliary piston 152 to collapse the vent portion 161 (i.e., move from right to left in FIG. 3). As the auxiliary piston 152 collapses the vent portion 161, air held within the vent portion 161 escapes through the vent 168 to atmosphere, and the auxiliary shaft 154 moves through the aperture 102 to contact the primary piston 112. The auxiliary shaft 154 continues to move through the aperture 102 under force of the auxiliary piston 152, overcoming the force of the primary spring 116 and forcing the primary piston 112 to collapse the slave portion 111 (i.e., move from right to left in FIG. 3). The hydraulic fluid occupying the slave portion 111 is urged out of the output opening 128 of the device 100 and into the slave cylinder to disengage the clutch. FIG. 4C is a simplified cross-section showing the device 100 actuated so that the primary shaft is driven into the adjustment screw. As can be seen, the piston has moved to the left of the page and the slave portion 111 has been reduced, while the master portion 113 has been expanded.

As mentioned above, in alternative embodiments, the device can be used to urge hydraulic fluid into the slave cylinder using a technique that does not rely on introducing an auxiliary fluid (e.g., a compressed gas or pressurized liquid) to a fill portion. For example, a solenoid (not shown, and not to be confused with the solenoid valve 184 that isolates an auxiliary fluid), generating an electromagnetic field, can urge the auxiliary piston 152 toward the aperture 102 with sufficient force to overcome the auxiliary spring 156, the primary spring 116, and the clutch spring to collapse the vent portion 161 and the slave portion 111, thereby urging the hydraulic fluid occupying the slave portion 111 out of the output opening 128 of the device and into the slave cylinder to disengage the clutch. To urge the auxiliary piston 152, the solenoid can be arranged so that the auxiliary piston 152 is within the generated electromagnetic field over its range of motion. For example, the auxiliary chamber 150 can be nested within a solenoid. Such a solenoid can be electrically connected so as to draw power from the vehicle battery when a trigger condition exists, or can be electrically connected to a dedicated energy source.

The diameter of the vent 168 can be adjustable to further allow calibration/adjustment of the device 100. Maximizing the diameter of the vent 168 will allow the vent portion 161 to be evacuated in the shortest amount of time, while minimizing the diameter of the vent 168 can resist evacuation relative to a larger diameter, increasing resistance to collapse of the vent portion 161. The diameter of the vent 168 can be adjusted, for example, using bleed pills threadably mateable with the vent 168. A set of bleed pills can allow the device 100 to adjust the activation speed of the device 100. The fill portion 163 preferably, though not necessarily, includes a bleed hole 166 for relieving excess pressure within the fill portion 163. As with the vent 168, bleed pills can optionally be provided to mate with the bleed hole 166 to define the diameter of the bleed hole 163.

Once the device 100 has been activated to prevent over-rev, the clutch remains disengaged from the transmission until the device 100 is manually reset, for example by a button, switch, or other trigger within the cabin of the vehicle or in the engine compartment. When a trigger is operated, compressed gas is vented from the fill portion 163 through the bleed hole 166 so that the auxiliary spring 156 can restore the auxiliary piston 152 to a deactivated position. As the auxiliary shaft 154 is drawn and/or urged out of the primary chamber 110, the primary spring 116 can restore the primary piston 112 to an unactuated position (provided the clutch pedal is not depressed). Alternatively, once the device 100 has been activated, the controller can be programmed to monitor engine speed and reset the device 100 when a triggering condition no longer exists, and/or some other predetermined criterion is satisfied, by de-activating the solenoid valve 184 and allowing the compressed gas to vent from the fill portion 163 so that the auxiliary spring 156 can restore the auxiliary piston 152 to a de-activated position. As the auxiliary shaft 154 is drawn and/or urged out of the primary chamber 110, the primary spring 116 can restore the primary piston 112 to an unactuated position (provided the clutch pedal is not depressed).

While the detailed partial cross-section of FIG. 3 illustrates structures with which the inventors contemplate a device in accordance with the present invention can be easily manufactured, and efficiently assembled and operated, the present invention is not intended to be limited to such structures. Rather, the inventors submit that the present invention can include any structures which facilitate actuation of a slave cylinder to disengage a clutch using a compressed gas, pressurized liquid, or other actuation technique upon receiving a command from a controller. One of ordinary skill in the art, upon reflecting on the teachings provided herein, will appreciate the myriad different structures with which the actuation of a slave cylinder by the device can be achieved. For example, in an alternative embodiment, one or more gaskets sealing the auxiliary chamber from the primary chamber can be mated with the aperture so that the gaskets remain fixed in place, thereby allowing the aperture (and the auxiliary shaft) to be reduced in length. In a further embodiment, the primary end cap and adjustment screw can be replaced by a threaded cap having internal threads that are advanced along outer threads of the body to adjust throw distance. In a still further embodiment, the primary and auxiliary chambers can be separately cast and mated by a check valve. In such an embodiment, the vent portion can include hydraulic fluid (and the vent can be connected with a hydraulic fluid source), so that hydraulic fluid is forced through the check valve to expand the master portion and urge the primary piston toward the output opening. In other embodiments, the auxiliary shaft can be connected with the primary piston and extend from the primary piston through the aperture so that once actuated, the auxiliary piston travels a distance before contacting the auxiliary shaft and urging the auxiliary shaft and primary piston toward the output opening. In still other embodiments, the auxiliary shaft can be connected to both the primary piston and the auxiliary piston so that the auxiliary piston and primary piston movement is synchronized. However, such an embodiment may be less desirable if, under driver control, the master cylinder of the clutch mechanism must apply sufficient hydraulic energy to overcome the auxiliary spring as well as the primary spring and clutch spring.

Figure 5:
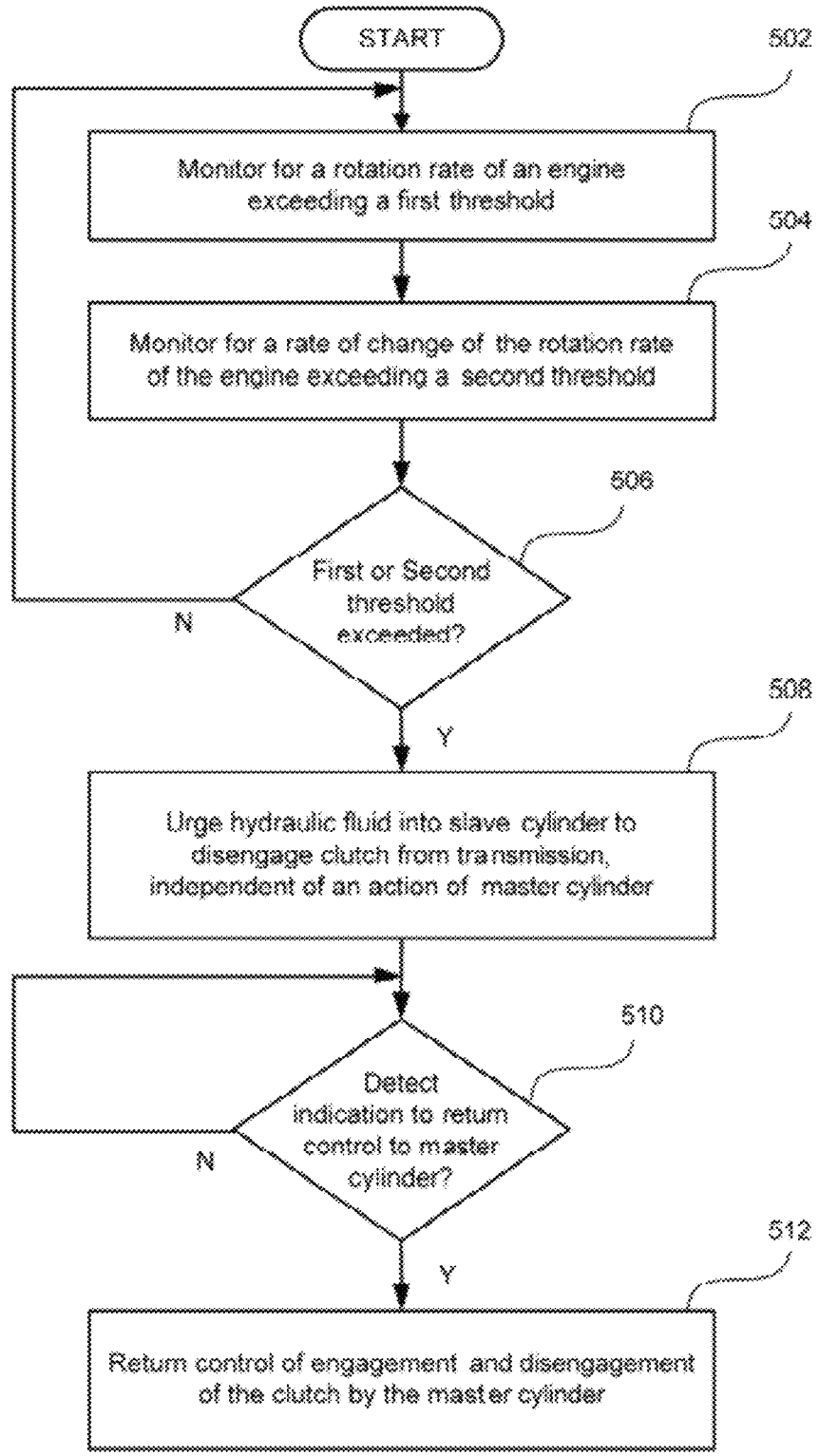
FIG. 5 is a flowchart of an embodiment of a method for disengaging a clutch from a transmission in accordance with the present invention.

FIG. 5 is a flowchart of an embodiment of a method for disengaging a clutch in accordance with the present invention for use with a vehicle including the clutch, an engine, a transmission, a slave cylinder and a master cylinder. The method includes monitoring for a rotation rate of the engine (or more generally a metric indicative thereof) exceeding a first threshold (Step 502), and monitoring for a rate of change of the rotation rate of the engine (or more generally a metric indicative thereof) exceeding a second threshold (Step 504). The second threshold event can be monitored for at all engine speeds, or the second threshold event can be monitored for when the engine speed is operating at or above a prescribed RPM value. When neither of the events being monitored for (at Steps 502 and 504) is detected, the master cylinder can be allowed to control urging hydraulic fluid into the slave cylinder. In other embodiments, the method can include monitoring for other events.

In response to detection of at least one of the events (Step 506), hydraulic fluid is urged into the slave cylinder to disengage the clutch from the transmission independent of an action of the master cylinder (Step 508). In another embodiment, both events must be detected before the hydraulic fluid is urged into the slave cylinder to disengage the clutch from the transmission independent of an action of the master cylinder. More generally, a triggering condition is predefined, and in response to the triggering condition being detected, the hydraulic fluid is urged into the slave cylinder to disengage the clutch from the transmission independent of an action of the master cylinder. A controller (e.g., 188) can perform the monitoring for the triggering condition. More generally, the triggering condition being monitored for can be detected, e.g., when at least one of the following events is detected: (1) a metric indicative of a rotation rate of the engine exceeds a first threshold, (2) the metric indicative of the rotation rate of the engine exceeds the first threshold for at least a specified period of time, (3) a metric indicative of a rate of change of the rotation rate of the engine exceeds a second threshold, and (4) the metric indicative of the rate of change of the rotation rate of the engine exceeds the second threshold for at least a specified period of time. Alternatively, the triggering condition being monitored for can be defined such that it is detected when at least two (or at least three) of the events of (1), (2), (3) and (4) are detected. Other triggering conditions are also possible, and within the scope of the present invention. A metric indicative of a rotation rate can be, e.g., RPM, or a value proportional to RPM, but is not limited thereto. A metric indicative of a rate of change of the rotation rate can be, e.g., RPM acceleration, or a value proportional to RPM acceleration, but is not limited thereto. In other embodiments, other triggering conditions are also possible, and within the scope of the present invention.

In an embodiment, hydraulic fluid is urged into the slave cylinder by moving a primary piston arranged between the master cylinder and the slave cylinder, and in response to detection of at least one of the events. In an embodiment, the primary piston is moved by engaging the primary piston using an auxiliary piston actuated by an auxiliary fluid. The auxiliary piston resists movement of the primary piston to the primary piston's initial position, thereby removing control of engagement and disengagement of the clutch by the master cylinder. In an embodiment, the primary piston is moved by engaging the primary piston using an auxiliary piston actuated by a solenoid. The solenoid can be configured to selectively apply an electromagnetic field to actuate the auxiliary piston. The auxiliary piston resists movement of the primary piston to the primary piston's initial position, thereby removing control of engagement and disengagement of the clutch by the master cylinder.

After activation, a signal can be initiated (Step 510) to return control of engagement and disengagement of the clutch to the master cylinder (Step 512), either manually (such as by the driver) or automatically (such as by the controller). More generally, control of engagement and disengagement of the clutch can be returned to the master cylinder in response to receiving an indication from a driver to do so, or in response to receiving an indication that the triggering condition is no longer detected. In accordance with an embodiment, the control of engagement and disengagement of the clutch can be returned to the master cylinder by exhausting the auxiliary fluid that was introduced so that the auxiliary piston moves from an actuated position to an unactuated position, and the primary piston is no longer blocked from returning to the primary piston's initial position.

Figure 6:
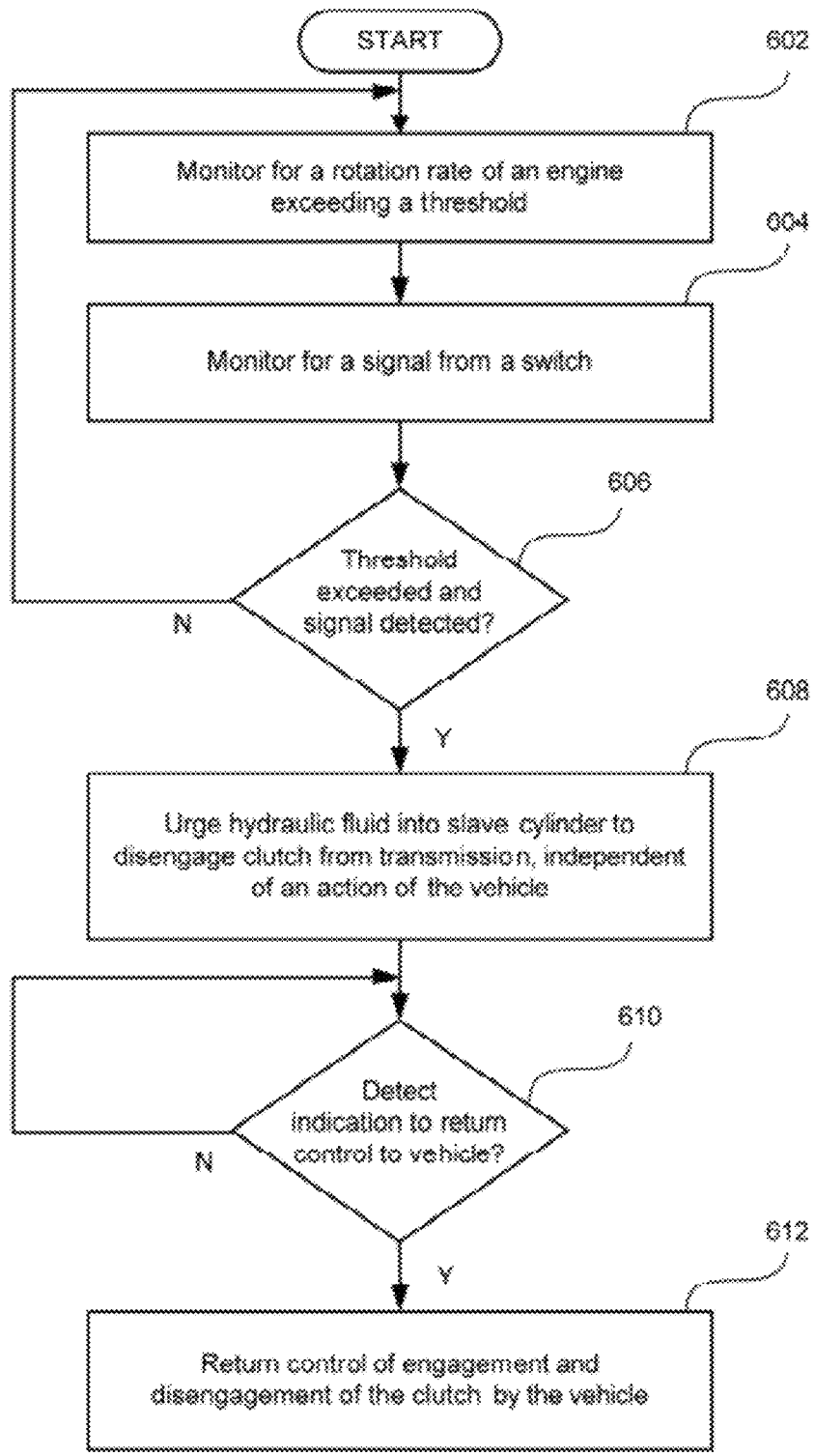
FIG. 6 is a flowchart of an embodiment of a method for disengaging a clutch from a sequential manual transmission in accordance with the present invention.

FIG. 6 is a flowchart of an embodiment of a method for disengaging a clutch in accordance with the present invention for use with a vehicle including the clutch, an engine, a SMT, and a slave cylinder (e.g., a motorcycle, a vehicle for use in high-performance auto racing). In normal operation, the slave cylinder is actuated to disengage the clutch from the SMT by a computer command sent by the vehicle. The method includes monitoring for a rotation rate of the engine (or more generally a metric indicative thereof) exceeding a threshold (Step 602), and monitoring for a signal from a downshift switch (Step 604). The switch could be included on a downshift end of a gear shifter so that if a driver downshifts (or alternatively if the driver attempts to downshift) the switch identifies the event to the controller. When neither of the events being monitored for (at Steps 602 and 604) is detected, a driver can successfully downshift without interference.

In response to detection of both of the events (Step 606), hydraulic fluid is urged into the slave cylinder to disengage the clutch from the SMT independent of an action of the vehicle (Step 608). More generally, a triggering condition is predefined, and in response to the triggering condition being detected, the hydraulic fluid is urged into the slave cylinder to disengage the clutch from the SMT independent of an action of the vehicle. A controller (e.g., 188) can perform the monitoring for the triggering condition. A metric indicative of a rotation rate can be, e.g., RPM, or a value proportional to RPM, but is not limited thereto. In other embodiments triggering conditions are also possible, and within the scope of the present invention.

In an embodiment, hydraulic fluid is urged into the slave cylinder by moving a primary piston in response to detection of at least one of the events. In an embodiment, the primary piston is moved by engaging the primary piston using an auxiliary piston actuated by an auxiliary fluid. The auxiliary piston resists movement of the primary piston to the primary piston's initial position, thereby removing control of engagement and disengagement of the clutch by the vehicle. In an embodiment, the primary piston is moved by engaging the primary piston using an auxiliary piston actuated by a solenoid. The solenoid can be configured to selectively apply an electromagnetic field to actuate the auxiliary piston. The auxiliary piston resists movement of the primary piston to the primary piston's initial position, thereby removing control of engagement and disengagement of the clutch by the vehicle.

After activation, a signal can be initiated (Step 610) to return control of engagement and disengagement of the clutch to the vehicle (Step 612), either manually (such as by the driver) or automatically (such as by the controller). More generally, control of engagement and disengagement of the clutch can be returned to the vehicle in response to receiving an indication from a driver to do so, or in response to receiving an indication that the triggering condition is no longer detected. In accordance with an embodiment, the control of engagement and disengagement of the clutch can be returned to the vehicle by exhausting the auxiliary fluid that was introduced so that the auxiliary piston moves from an actuated position to an unactuated position, and the primary piston is no longer blocked from returning to the primary piston's initial position.

While the figures and descriptions of embodiments provided herein have been directed to disengaging a clutch coupling an internal combustion engine with a transmission, it should be noted that embodiments of methods, devices, and systems in accordance with the present invention can be used with any power plant that uses different gear ratios with a drivetrain. For example, electric motors, while having flat torque curves when compared with internal combustion engines, commonly make use of transmissions having at least two different gear ratios. Methods, systems and devices in accordance with the present invention can be used to prevent damage to electric motors. For example, with additional triggers (such as a load sensor), methods, systems and devices in accordance with the present invention can prevent electric motor damage that may occur due to overspeeding (running at an RPM in excess of design limits) if the unit is operated with insufficient load.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

What is claimed is:

1. A device for use with a vehicle including a clutch, a clutch pedal or lever, a transmission, a slave cylinder, and a master cylinder, the device for selectively disengaging the clutch from the transmission, comprising:
  a primary piston configured to urge hydraulic fluid into the slave cylinder, when the primary piston is moved from a first position to a second position, to thereby disengage the clutch from the transmission;
  wherein the primary piston is normally movable from the first position to the second position by hydraulic actuation of the master cylinder that occurs in response to actuation of the clutch pedal or lever; and
  a secondary piston configured to selectively apply force to the primary piston, to move the primary piston from the first position to the second position, when the secondary piston is selectively actuated independent of hydraulic actuation of the master cylinder;
  wherein the secondary piston is configured such that the secondary piston does not move when the primary piston moves from the first position to the second position by hydraulic actuation of the master cylinder that occurs in response to actuation of the clutch pedal or lever.

2. The device of claim 1, wherein the secondary piston is selectively actuated by a secondary fluid independent of hydraulic actuation of the master cylinder.

3. The device of claim 2, wherein the secondary fluid is a compressed gas including at least one of nitrogen, carbon dioxide, nitrous oxide, oxygen, and air.

4. The device of claim 2, further comprising:
a primary chamber within which is located the primary piston; and
a secondary chamber within which is located the secondary piston.

5. The device of claim 4, further comprising:
a solenoid valve configured to selectively introduce the secondary fluid into the secondary chamber to thereby actuate the secondary piston.

6. The device of claim 1, wherein the primary piston and the secondary piston are unconnected with one another, thereby enabling the primary piston to be moved independent of the secondary piston.

7. The device of claim 1, wherein the primary piston and the secondary piston are separately biased toward a same direction.

8. A device for use with a vehicle including a clutch, a transmission, a slave cylinder, and a master cylinder, the device for selectively disengaging the clutch from the transmission, comprising:
a primary piston configured to urge hydraulic fluid into the slave cylinder, when the primary piston is moved from a first position to a second position, to thereby disengage the clutch from the transmission;
wherein the primary piston is normally movable from the first position to the second position by hydraulic actuation of the master cylinder; and
a secondary piston configured to selectively apply force to the primary piston, to move the primary piston from the first position to the second position, when the secondary piston is selectively actuated independent of hydraulic actuation of the master cylinder;
wherein the secondary piston is configured such that the secondary piston does not move when the primary piston moves from the first position to the second position by hydraulic actuation of the master cylinder; and
wherein the secondary piston is selectively actuated by a solenoid.

9. A method for use with a vehicle including a clutch, a transmission, a slave cylinder, a master cylinder, an engine, and a disengagement device, wherein the disengagement device includes a primary piston and a secondary piston, the method for selectively disengaging the clutch from the transmission, the method comprising:
(a) monitoring for a triggering condition that relates to a rotation rate of the engine;
(b) when the triggering condition being monitored for at step (a) is not detected, selectively urging hydraulic fluid into the slave cylinder to disengage the clutch from the transmission in dependence on an action of the master cylinder moving the primary piston, without moving the secondary piston; and
(c) when the triggering condition being monitored for at step (a) is detected, moving the secondary piston to apply force to the primary piston and thereby urging hydraulic fluid into the slave cylinder to disengage the clutch from the transmission independent of an action of the master cylinder;
wherein the triggering condition being monitored for at step (a) is detected when at least one of the following events is detected (a1) a metric indicative of a rotation rate of the engine exceeds a first threshold;
(a2) the metric indicative of the rotation rate of the engine exceeds the first threshold for at least a specified period of time
(a3) a metric indicative of a rate of change of the rotation rate of the engine exceeds a second threshold; or
(a4) the metric indicative of the rate of change of the rotation rate of the engine exceeds the second threshold for at least a specified period of time.

10. The method of claim 9, wherein the triggering condition being monitored for at step (a) is detected when at least two of the events of (a1), (a2), (a3) or (a4) are detected.

11. The method of claim 9, wherein:
hydraulic fluid is urged into the slave cylinder by moving the primary piston arranged between the master cylinder and the slave cylinder; and
step (c) includes moving the primary piston by engaging the primary piston using the secondary piston actuated by a secondary fluid, the secondary fluid being introduced to the secondary piston in response to detecting the triggering condition.

12. The method of claim 11, wherein:
in step (c) the primary piston is moved in a first direction so that hydraulic fluid is urged into the slave cylinder; and
the secondary piston resists movement of the primary piston in a second direction opposite the first direction, thereby removing control of engagement and disengagement of the clutch by the master cylinder; and
further comprising:
(d) exhausting the secondary fluid that was introduced at step (c) so that the secondary piston moves from an actuated position to an unactuated position, to thereby return control of engagement and disengagement of the clutch to the master cylinder.

13. The method of claim 12, wherein step (d) is performed in response to at least one of the following events:
receiving an indication from a driver to return control of engagement and disengagement of the clutch to the master cylinder; or
receiving an indication that the triggering condition is no longer detected.

14. The method of claim 9, wherein:
hydraulic fluid is urged into the slave cylinder by moving the primary piston arranged between the master cylinder and the slave cylinder; and
step (c) includes moving the primary piston by engaging the primary piston using the secondary piston actuated by an electromagnetic field generated by a solenoid in response to detecting the triggering condition.

15. A device for use with a vehicle including an engine, a clutch, a transmission, a slave cylinder, and a master cylinder, the device for selectively disengaging the clutch from the transmission, and the device comprising:
a primary cylinder including
a first opening hydraulically connectable with the master cylinder,
a second opening hydraulically connectable with the slave cylinder, and
a primary piston arranged between the first opening and the second opening and biased toward the first opening;
a secondary cylinder including
an inlet adapted to selectively receive a secondary fluid,
a secondary piston biased toward the inlet, and
a shaft connected with the secondary piston; and an aperture extending between the secondary cylinder and the primary cylinder;
wherein the shaft connected with the secondary piston is received at least partially within the aperture and a seal is formed between the shaft and the aperture such that the primary cylinder is substantially isolated from the secondary cylinder;
wherein the shaft is not connected with the primary piston;
wherein the clutch is disengageable from the transmission when fluid is urged from the primary cylinder to the slave cylinder by moving the primary piston toward the second opening; and
wherein the primary piston is movable toward the second opening by urging fluid from the master cylinder into the primary cylinder at the first opening of the primary cylinder and/or introducing the secondary fluid into the secondary cylinder at the inlet to move the secondary piston toward the aperture so that the shaft moves through the aperture and contacts the primary piston.

16. The device of claim 15, further comprising:
a valve adapted to substantially seal the inlet of the secondary cylinder from the secondary fluid;
wherein the valve is adapted to selectively allow the secondary fluid to enter the inlet of the secondary cylinder in response to a signal from a controller.

17. The device of claim 16, wherein the valve comprises a solenoid valve.

18. The device of claim 16, wherein:
the controller is a adapted to monitor for a triggering condition that relates to a rotation rate of the engine, and in response to detecting the triggering condition generate the signal to cause the valve to allow the secondary fluid to enter the inlet of the secondary cylinder.

19. The device of claim 18, wherein the controller is adapted to detect the triggering condition when the controller detects at least one of the following events:
a metric indicative of a rotation rate of the engine exceeds a first threshold;
the metric indicative of the rotation rate of the engine exceeds the first threshold for at least a specified period of time;
a metric indicative of a rate of change of the rotation rate of the engine exceeds a second threshold; or
the metric indicative of the rate of change of the rotation rate of the engine exceeds the second threshold for at least a specified period of time.

20. The device of claim 15, wherein:
the secondary fluid comprises a compressed gas; and
the secondary cylinder further includes a release valve to allow the compressed gas to be vented from the secondary cylinder.

21. The device of claim 20, wherein:
the secondary cylinder further includes a bleed hole allowing the compressed gas to predictably leak to an environment.

22. The device of claim 20, wherein the compressed gas includes at least one of nitrogen, carbon dioxide, nitrous oxide, oxygen, and air.

23. A device for use with a vehicle including an engine, a clutch, a transmission, a slave cylinder, and a master cylinder, the device for selectively disengaging the clutch from the transmission, and the device comprising:
a primary cylinder including
a first opening hydraulically connectable with the master cylinder,
a second opening hydraulically connectable with the slave cylinder, and
a primary piston arranged between the first opening and the second opening and biased toward the first opening;
a secondary cylinder including
an inlet adapted to selectively receive a secondary fluid,
a secondary piston biased toward the inlet, and
a shaft connected with the secondary piston;
an aperture extending between the secondary cylinder and the primary cylinder; and
a stop connectable with the primary cylinder and adjustable to limit the travel distance of the primary piston;
wherein the shaft connected with the secondary piston is received at least partially within the aperture and a seal is formed between the shaft and the aperture such that the primary cylinder is substantially isolated from the secondary cylinder;
wherein the clutch is disengageable from the transmission when fluid is urged from the primary cylinder to the slave cylinder by moving the primary piston toward the second opening;
wherein the primary piston is movable toward the second opening by urging fluid from the master cylinder into the primary cylinder at the first opening of the primary cylinder and/or introducing the secondary fluid into the secondary cylinder at the inlet to move the secondary piston toward the aperture so that the shaft moves through the aperture and contacts the primary piston; and
wherein the stop comprises one of
a cap having internal threads mateable and advanceable along external threads of the primary cylinder, or
a screw having external threads mateable and advanceable along internal threads of the primary cylinder.

24. A device for use with a vehicle including an engine, a clutch, a transmission, a slave cylinder, and a master cylinder, the device for selectively disengaging the clutch from the transmission, and the device comprising:
a primary cylinder including
a first opening hydraulically connectable with the master cylinder,
a second opening hydraulically connectable with the slave cylinder, and
a primary piston arranged between the first opening and the second opening and biased toward the first opening;
a secondary cylinder including
an inlet adapted to selectively receive a secondary fluid,
a secondary piston biased toward the inlet, and
a shaft connected with the secondary piston; and
an aperture extending between the secondary cylinder and the primary cylinder;
wherein the shaft connected with the secondary piston is received at least partially within the aperture and a seal is formed between the shaft and the aperture such that the primary cylinder is substantially isolated from the secondary cylinder;
wherein the clutch is disengageable from the transmission when fluid is urged from the primary cylinder to the slave cylinder by moving the primary piston toward the second opening;
wherein the primary piston is movable toward the second opening by urging fluid from the master cylinder into the primary cylinder at the first opening of the primary cylinder and/or introducing the secondary fluid into the secondary cylinder at the inlet to move the secondary piston toward the aperture so that the shaft moves through the aperture and contacts the primary piston; and wherein the primary piston is biased toward the inlet by a first spring; and wherein the secondary piston is biased toward the inlet by a second spring.

25. A device for use with a vehicle including an engine, a clutch, a transmission, a slave cylinder, and a master cylinder, the device for selectively disengaging the clutch from the transmission, and the device comprising:

a primary cylinder including
a first opening hydraulically connectable with the master cylinder,
a second opening hydraulically connectable with the slave cylinder, and
a primary piston arranged between the first opening and the second opening and biased toward the first opening;

a secondary cylinder including
an inlet adapted to selectively receive a secondary fluid,
a secondary piston biased toward the inlet, and
a shaft connected with the secondary piston; and an aperture extending between the secondary cylinder and the primary cylinder;

wherein the shaft connected with the secondary piston is received at least partially within the aperture and a seal is formed between the shaft and the aperture such that the primary cylinder is substantially isolated from the secondary cylinder;

wherein the clutch is disengageable from the transmission when fluid is urged from the primary cylinder to the slave cylinder by moving the primary piston toward the second opening;

wherein the primary piston is movable toward the second opening by urging fluid from the master cylinder into the primary cylinder at the first opening of the primary cylinder and/or introducing the secondary fluid into the secondary cylinder at the inlet to move the secondary piston toward the aperture so that the shaft moves through the aperture and contacts the primary piston;

wherein the primary cylinder further includes a third opening between a fully biased position of the primary piston and the second opening; and wherein the third opening is hydraulically connectable with a fluid reservoir.

26. A device for use with a vehicle including an engine, a clutch, a transmission, a slave cylinder, and a master cylinder, the device for selectively disengaging the clutch from the transmission, and the device comprising:

a primary cylinder including
a first opening hydraulically connectable with the master cylinder,
a second opening hydraulically connectable with the slave cylinder, and
a primary piston arranged between the first opening and the second opening and biased toward the first opening;

a secondary cylinder including
an inlet adapted to selectively receive a secondary fluid,
a secondary piston biased toward the inlet, and
a shaft connected with the secondary piston; and an aperture extending between the secondary cylinder and the primary cylinder;

wherein the shaft connected with the secondary piston is received at least partially within the aperture and a seal is formed between the shaft and the aperture such that the primary cylinder is substantially isolated from the secondary cylinder;

wherein the clutch is disengageable from the transmission when fluid is urged from the primary cylinder to the slave cylinder by moving the primary piston toward the second opening;

wherein the primary piston is movable toward the second opening by urging fluid from the master cylinder into the primary cylinder at the first opening of the primary cylinder and/or introducing the secondary fluid into the secondary cylinder at the inlet to move the secondary piston toward the aperture so that the shaft moves through the aperture and contacts the primary piston;

wherein the secondary cylinder further includes a vent within a wall of the secondary cylinder between the secondary piston and the aperture; and wherein the vent allows venting of the secondary cylinder to an environment when the secondary piston is moved toward the aperture.

27. A device for use with a vehicle including a clutch, a transmission, a slave cylinder, and a master cylinder, the device for selectively disengaging the clutch from the transmission, comprising:

a primary piston configured to urge hydraulic fluid into the slave cylinder, when the primary piston is moved from a first position to a second position, to thereby disengage the clutch from the transmission;

wherein the primary piston is normally movable from the first position to the second position by hydraulic actuation of the master cylinder; and a secondary piston configured to selectively apply force to the primary piston, to move the primary piston from the first position to the second position, when the secondary piston is selectively actuated independent of hydraulic actuation of the master cylinder;

wherein the secondary piston is configured such that the secondary piston does not move when the primary piston moves from the first position to the second position by hydraulic actuation of the master cylinder; and a shaft connected with the secondary piston, unconnected with the primary piston, and including first and second ends;

wherein the first end of the shaft is connected with the secondary piston; and wherein the second end of the shaft selectively contacts the primary piston thereby enabling the secondary piston to selectively apply force to the primary piston.

* * * * *